United States Patent [19]

Götz

[11] 3,872,900

[45] Mar. 25, 1975

[54] FILLER PIPE FOR A FUEL TANK OF A MOTOR VEHICLE

[75] Inventor: Hans Götz, Boblingen-Dagersheim, Germany

[73] Assignee: Daimler-Benz Aktiengesellschaft, Stuttgart, Germany

[22] Filed: Feb. 22, 1973

[21] Appl. No.: 334,752

[30] Foreign Application Priority Data

Feb. 22, 1972 Germany............................ 2208189

[52] U.S. Cl. ............................... 141/392, 220/86 R
[51] Int. Cl. ........ B65b 1/04, B65b 3/24, B67c 3/34
[58] Field of Search.................... 141/392, 204, 390; 220/86 R

[56] References Cited
UNITED STATES PATENTS
3,133,564  5/1964  Hunter............................. 220/86 R Primary Examiner—William D. Martin, Jr.
Assistant Examiner—A. J. Mirabito
Attorney, Agent, or Firm—Craig & Antonelli

[57] ABSTRACT

A filler pipe for a fuel tank of a motor vehicle, especially for a fuel tank with a substantially horizontal pipe section terminating in the fuel tank near the upper boundary wall of the fuel tank and with a slightly inclined section, in which terminates also a small vent pipe additionally connecting the tank with the filler pipe; in addition to a first web plate, the filler pipe is provided with a second web plate which is located downstream of the first web plate and upstream of the discharge orifice of the vent pipe in the filler pipe, and more particularly along the upper side of the inside of the filler pipe.

21 Claims, 3 Drawing Figures

PATENTED MAR 25 1975    3,872,900

FILLER PIPE FOR A FUEL TANK OF A MOTOR VEHICLE

The present invention relates to a filler pipe for a fuel tank of a motor vehicle with a segmentally shaped vertical sheet metal web plate arranged at the lower side on the inside of the filler pipe in proximity to the insert aperture for the fuel discharge pipe, at the end of the hose as used in conventional fuel pumps of gas stations, especially to a filler pipe with filler pipe sections extending in part horizontally and in part at a slight inclination, which with its horizontal section terminates in the fuel tank near the upper boundary wall of the fuel tank, whereby the fuel tank is additionally connected with the filler pipe by way of a small vent pipe that terminates in the inclined section of the filler pipe approximately in the center of its upper half.

Fuel tanks, for safety reasons, are arranged for the most part over the rear axle of a motor vehicle between luggage space and passenger space. A type of construction for the fuel tank with an essentially horizontally extending connecting pipe necessarily results therefrom which terminates in the fuel tank near the upper boundary wall of the fuel tank. The filler opening for these tanks is arranged, for the most part, on the side surface in the rear fender.

Disadvantageous with this construction of the filler pipe having a short pipe section which extends only at a slight inclination is the tanking, i.e., filling with fuel of the fuel tank which can be undertaken only with difficulties and only manually at least in the end phase of the filling operation. This is so as ordinarily the automatic discharge valve or nozzle provided with a pilot pin or the like that is customarily provided at the end of the fuel line in fuel discharge pumps, shuts off normally after already a quite short period of time because the surface of the filled-in fuel or the fuel spray reaches the feeler nozzle of the discharge pipe normally immersed deeply into the filler pipe. It is therefore necessary to fill the last part of the fuel by hand. Additionally, paint or lacquer damages are readily caused at the body by the fill nozzle owing to an excessively low immersion thereof into the filler pipe.

It is the aim of the present invention to avoid these disadvantages, i.e., lacquer or paint damages and manual operation so that the tank can be completely filled automatically without requiring that the discharge pipe be manually actuated during the last phase of the filling operation.

The underlying problems are solved according to the present invention in that behind the first web plate a second segmentally shaped sheet metal web plate is arranged upstream of the orifice of the vent pipe in the filler pipe connection as viewed in the insert direction of the discharge nozzle, i.e., at its upper side in the inside thereof.

For a facilitated insertion of the pump discharge pipe or nozzle, the web plates may be inclined in the insert direction of the discharge pipe or nozzle by about 28° with respect to the respective cross-sectional plane. Additionally, the sheet metal web plates may be flanged over at the straight edge thereof toward the respective nearer wall of the filler pipe.

In order to avoid in every case that the discharge pipe or nozzle might be inserted further than contemplated according to the present invention, the upper web plate may be angularly bent twice along its straight edge and the thus-formed free cross strip may limit the insertion of the discharge pipe or nozzle.

It is appropriate for the facilitated insertion also of discharge pipes or nozzles of larger diameter than the largest interior width in the insertion opening of the closure socket is arranged in the vertical plane thereof.

Accordingly, it is an object of the present invention to provide a filler pipe for a fuel tank of a motor vehicle which avoids by simple means the aforementioned shortcomings and drawbacks encountered in the prior art.

Another object of the present invention resides in a filler pipe for a fuel tank of a motor vehicle which permits the complete automatic filling without the need for manual operation during the final filling phase.

A further object of the present invention resides in a filler pipe for a fuel tank of a motor vehicle which avoids the danger of damage to the paint of the body due to spilling of the fuel during the filling operation.

These and other objects, features and advantages of the present invention will become more apparent from the following description when taken in connection with the accompanying drawings which shows, for purposes of illustration only, one embodiment in accordance with the present invention, and wherein.

Figure 1:
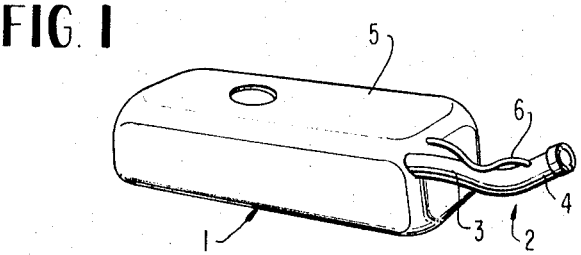
FIG. 1 is a perspective view of a fuel tank with which the present invention can be applied.

Referring now to the drawing wherein like reference numerals are used throughout the various views to designate like parts, the fuel tank generally designated by reference numeral 1 of a motor vehicle which is illustrated in FIG. 1 includes a filler pipe generally designated by reference numeral 2 with a horizontally extending section 3 and a section 4 having a slight inclination. The horizontally extending section 3 of the filler pipe 2 terminates near the upper boundary wall 5 of the fuel tank 1 in the latter. The fuel tank 1 is additionally connected with the filler pipe 2 by a small vent pipe 6. The small vent pipe 6 terminates in the inclined section 4 of the filler pipe 2 approximately in the center of its upper half.

In proximity of the insertion opening or aperture 7 for a discharge pipe 8 with pilot pin of conventional construction of a fill nozzle 9 there is arranged at the lower side on the inside of the filler pipe 2 a segmentally shaped vertical sheet metal web plate 11, against which the discharge pipe 8 is to support itself after its insertion. However, it is possible notwithstanding this web plate 11 that the fill nozzle 9 is introduced excessively inclined drooping or too deep into the filler pipe 2 so that the feeler nozzle 12 of conventional construction is acted upon by fuel or fuel spray and as a result thereof the automatic mechanism built into the fill nozzle 9 prematurely turns off the fuel flow.

Figure 2:
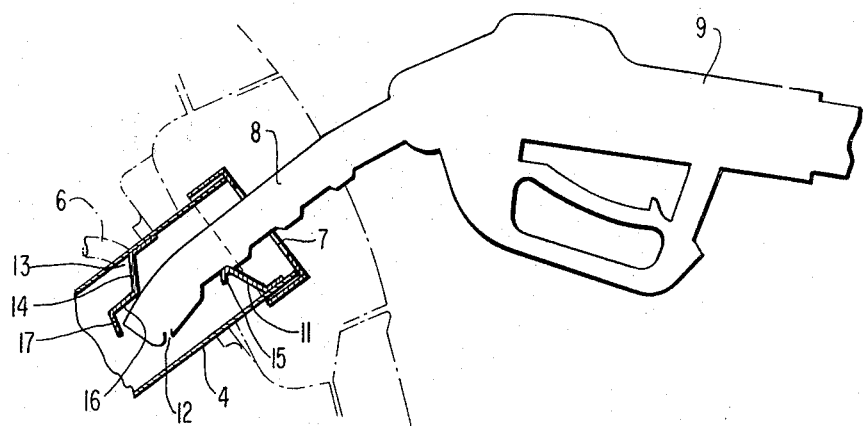
FIG. 2 is a partial longitudinal cross-sectional view through a filler pipe at its fill-in aperture with a discharge pipe inserted into the same and with a fill nozzle adjoining the same.

In order to avoid this, a second segmentally shaped vertical sheet metal work plate 14 is arranged on the inside of the filler pipe 2 downstream of the first web plate 11 and upstream of the discharge orifice 13 of the small vent pipe 6 in the filler pipe 2 as viewed in the insertion direction, i.e., at the upper side of the filler pipe 2, in a manner corresponding to the first web plate 11. As a result thereof, the discharge pipe 8 can be inserted into the filler pipe 2 only so far as is absolutely necessary. Additionally, the entire fill nozzle 9 is also brought thereby into a proper position illustrated in FIG. 2. As a result thereof, the valve body receives the necessary spacing from the body of the vehicle so that in this position lacquer or paint damages at the body cannot be caused. Additionally, the automatic fill nozzle mechanism shuts off only when the tank is actually full because in the position as illustrated in FIG. 2, fuel does not reach the feeler nozzle 12 prior thereto. Additionally, the discharge orifice 13 of the small vent pipe 6 is protected by the provision and particular arrangement of the second web plate 14.

The sheet metal web plates 11 or 14 may be each flanged over along their straight edge 15 or 16 in the direction toward the respectively nearer wall surface of the filler pipe 2. As a result thereof, the web plates become stable and rigid and connot be damaged regardless of the roughness of the insertion of the hose discharge pipe.

In order to avoid an excessively deep insertion of the discharge pipe 8 also in case of the most varied diameters thereof, the upper web plate 14 may be angularly bent twice at its straight edge 16 so that the thus formed free transverse strip 17 limits in every case the insertion of the discharge pipe 8.

Figure 3:
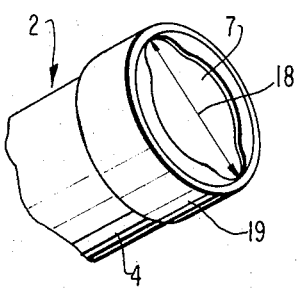
FIG. 3 is a partial perspective view of the free end of the filler pipe with the fill-in aperture according to the present invention.

With the different diameters of the existing discharge pipes 8, it is advantageous if with the arrangement of a second sheet metal web plate 14, the largest internal width in the insert aperture 7, is arranged in a vertical plane at the closure socket 19 as shown in FIG. 3.

The web plates 11 and 14 are inclined by about 28° in the insertion direction of the discharge pipe 8 with respect to the respective cross-sectional plane.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

What I claim is:

1. A filler pipe for a fuel tank of a motor vehicle with a first web plate means arranged on the inside of the filler pipe in proximity to the insert aperture for a discharge pipe, in which the fuel tank is additionally connected with the filler pipe by a small vent pipe, characterized in that a second web plate means is arranged on the inside of the filler pipe downstream of the first web plate means and upstream of the discharge orifice of the small vent pipe in the filler pipe as viewed in the insert direction of the discharge pipe, the second web plate means is arranged at the upper surface with respect to the vertical of the filler pipe on the inside thereof, wherein the filler pipe has a substantially horizontally extending section and a slightly incline section, the horizontal section of the filler pipe terminating near the upper boundary wall of the fuel tank in the latter, said small vent pipe terminating in the incline section of the filler pipe approximately in the center of its upper surface, and wherein the web plate means are inclined in the insert direction of the discharge pipe by about 28° with respect to a respective cross-sectional plane of the filler pipe, said web plate means including substantially straight edge portions which are flanged over in the direction toward a respective mounting wall of the web plate means in the filler pipe, and further characterized in that the second-mentioned web plate means includes a substantially straight edge portion and is angularly bent twice at its straight edge portion, and in that the thus-formed transverse strip having a free edge limits the introduction of the discharge pipe.

2. A filler pipe according to claim 1, with a closure socket means provided with an insert aperture, characterized in that the greatest internal width at said insert aperture is arranged in a substantially vertical plane.

3. A filler pipe for a fuel tank of a motor vehicle with a first web plate means arranged on the inside of the filler pipe in proximity to the insert aperture for a discharge pipe, in which the fuel tank is additionally connected with the filler pipe by a small vent pipe, characterized in that a second web plate means is arranged on the inside of the filler pipe downstream of the first web plate means and upstream of the discharge orifice of the small vent pipe in the filler pipe as viewed in the insert direction of the discharge pipe, wherein the web plate means include substantially straight edge portions which are flanged over in the direction toward a respective mounting wall of the web plate means in the filler pipe, and further characterized in that the second-mentioned web plate means includes a substantially straight edge portion and is angularly bent twice at its straight edge portion, and in that the thus-formed transverse strip having a free edge limits the introduction of the discharge pipe.

4. A filler pipe for a fuel tank of a motor vehicle with a first web plate means arranged on the inside of the filler pipe in proximity to the insert aperture for a discharge pipe, in which the fuel tank is additionally connected with the filler pipe by a small vent pipe, characterized in that a second web plate means is arranged on the inside of the filler pipe downstream of the first web plate means and upstream of the discharge orifice of the small vent pipe in the filler pipe as viewed in the insert direction of the discharge pipe, and further characterized in that the second-mentioned web plate means includes a substantially straight edge portion and is angularly bent twice at its straight edge portion, and in that the thus-formed transverse strip having a free edge limits the introduction of the discharge pipe.

5. A filler pipe for providing complete automatic filling of a fuel tank, said filler pipe comprising
an elongated tubular member having a first insert end and a second connecting end, said second connecting end being connected to a fuel tank,
a vent pipe having a first end connected to said tubular member intermediate of said first and second ends of said tubular member, said vent pipe having a second end connected to said fuel tank,
a first web plate means for supporting a filling discharge nozzle inserted into said first insert end of said tubular member, said first web plate means being mounted on an inside surface of said tubular member in proximity to said first insert end of said tubular member, and
a second web plate means for effecting a predetermined amount of insertion of said filling discharge nozzle into said tubular member, said second web plate means being mounted on a second inside surface of said tubular member, and said second web plate means being arranged between the connection of said first end of said vent pipe with said tubular member and said first web plate means, said first and second web plate means acting to support said filling discharge nozzle in a predetermined position enabling complete automatic filling of said fuel tank.

6. A filler pipe according to claim 5 wherein said first and second web plate means act to support said filling discharge nozzle substantially along the axis of said tubular member.

7. A filler pipe according to claim 5, wherein said filling discharge nozzle is supported inside said tubular member only by said first and second web plate means.

8. A filler pipe according to claim 5, wherein said tubular member is constructed with an inner peripheral surface having a generally upper inner surface with respect to the vertical and a generally lower inner surface with respect to the vertical.

9. A filler pipe according to claim 8, wherein said first web plate means is mounted on said lower inner surface, and said second web plate means is mounted on said upper inner surface.

10. A filler pipe according to claim 8, wherein said tubular member has a substantially horizontally extending section and a slightly inclined section, said horizontal section terminating at said second connecting end of said tubular member.

11. A filler pipe according to claim 10, wherein said second connecting end connects into an upper boundary wall of said fuel tank.

12. A filler pipe according to claim 10, wherein said connection of said first end of said vent pipe terminates in said inclined section of said tubular member approximately in the center of an upper surface of said tubular member.

13. A filler pipe according to claim 10, wherein said inclined section is inclined slightly upwardly with respect to said horizontal section.

14. A filler pipe according to claim 8, wherein said first and second web plate means are sheet metal plates extending from the inner peripheral surface of said tubular member.

15. A filler pipe according to claim 14, wherein said first and second web plate means are inclined in the direction of insertion of said filler discharge nozzle by about 28° with respect to a respective cross-sectional plane of said tubular member.

16. A filler pipe according to claim 14, wherein said web plate means include substantially straight edge portions which are flanged over in the direction toward a respective peripheral surface of said web plate means.

17. A filler pipe according to claim 16, wherein said second web plate means is angularly bent twice at its straight edge portion to form a transverse strip having a free edge, said transverse strip limiting the insertion of said filling discharge nozzle into said tubular member.

18. A filler pipe according to claim 17, wherein said elongated tubular member is provided with a closure socket means at said first insert end of said tubular member, said closure socket means having an aperture opening into said tubular member, and said aperture has a configuration with a dimension in a substantially vertical plane being greatest than other dimensions of the aperture configuration.

19. A filler pipe according to claim 5, wherein said elongated tubular member is provided with a closure socket means at said first insert end of said tubular member, said closure socket means having an aperture opening into said tubular member, and said aperture has a configuration with a dimension in a substantially vertical plane being greatest than other dimensions of the aperture configuration.

20. A filler pipe according to claim 5, wherein said second web plate means is mounted with respect to said connection of said first end of said vent pipe with said tubular member to protect the discharge opening of said vent pipe into said tubular member.

21. A filler pipe according to claim 5, wherein said second web plate means is angularly bent twice at its straight edge portion to form a transverse strip having a free edge, said transverse strip limiting the insertion of said filling discharge nozzle into said tubular member.

* * * * *